United States Patent
Yang

(10) Patent No.: US 11,336,763 B2
(45) Date of Patent: May 17, 2022

(54) INCOMING CALL PROCESSING METHOD, MOBILE TERMINAL, AND COMPUTER STORAGE MEDIUM

(71) Applicant: ZTE CORPORATION, Guangdong (CN)

(72) Inventor: Haicheng Yang, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/267,718

(22) PCT Filed: Aug. 22, 2019

(86) PCT No.: PCT/CN2019/101878
§ 371 (c)(1),
(2) Date: Feb. 10, 2021

(87) PCT Pub. No.: WO2020/048316
PCT Pub. Date: Mar. 12, 2020

(65) Prior Publication Data
US 2021/0329117 A1    Oct. 21, 2021

(30) Foreign Application Priority Data
Sep. 3, 2018  (CN) .......... 201811022966.X

(51) Int. Cl.
*H04M 1/663*       (2006.01)
*H04M 3/22*        (2006.01)
(Continued)

(52) U.S. Cl.
CPC ......... *H04M 1/663* (2013.01); *H04M 3/2218* (2013.01); *H04M 3/2281* (2013.01);
(Continued)

(58) Field of Classification Search
CPC .. H04M 1/663; H04M 3/2218; H04M 3/2281; H04M 3/436; H04M 7/0078; H04M 3/42059; H04W 12/121
(Continued)

(56) References Cited

U.S. PATENT DOCUMENTS 6,157,825 A * 12/2000 Frederick ............ H04W 12/126
                                                    379/189
8,238,532 B1 * 8/2012 Cox ...................... H04M 15/47
                                                    379/144.03
(Continued)

FOREIGN PATENT DOCUMENTS

CN    1859491 A    11/2006
CN    1925522 A    3/2007
(Continued)

OTHER PUBLICATIONS

ZTE Corporation, International Search Report, PCT/CN2019/101878, dated Aug. 22, 2019, 10 pgs.
(Continued)

*Primary Examiner* — Binh Kien Tieu
(74) *Attorney, Agent, or Firm* — USCH Law, PC

(57) ABSTRACT

Disclosed is an incoming call processing method, applied to a mobile terminal and including: after receiving an incoming call carrying an INVITE signaling, determining, according to the INVITE signaling, a type of a calling number corresponding to the incoming call; determining whether the incoming call is a malicious call based on the type of the calling number; and intercepting the incoming call when it is determined that the incoming call is a malicious call. Also disclosed are a mobile terminal and a computer storage medium.

14 Claims, 8 Drawing Sheets

(51) Int. Cl.
    *H04M 3/436*         (2006.01)
    *H04M 7/00*           (2006.01)
    *H04M 3/42*           (2006.01)
    *H04W 12/121*       (2021.01)

(52) U.S. Cl.
    CPC ......... *H04M 3/436* (2013.01); *H04M 7/0078* (2013.01); *H04W 12/121* (2021.01); *H04M 3/42059* (2013.01)

(58) Field of Classification Search
    USPC ........................................................ 455/411
    See application file for complete search history.

(56) References Cited

U.S. PATENT DOCUMENTS

| | | | | |
|---|---|---|---|---|
| 9,172,808 | B2* | 10/2015 | Zeppenfeld | H04M 3/5183 |
| 9,177,293 | B1* | 11/2015 | Gagnon | G06Q 10/107 |
| 9,426,302 | B2* | 8/2016 | Layman | H04M 3/42314 |
| 9,781,255 | B1* | 10/2017 | Gailloux | H04L 63/126 |
| 9,819,797 | B2* | 11/2017 | Sharpe | H04M 3/436 |
| 10,063,699 | B1* | 8/2018 | Raman | H04L 9/006 |
| 10,122,851 | B2* | 11/2018 | Algard | H04M 7/0021 |
| 10,462,292 | B1* | 10/2019 | Stephens | H04M 3/42059 |
| 10,681,556 | B2* | 6/2020 | Filart | H04W 12/122 |
| 10,715,656 | B2* | 7/2020 | Douglas | H04M 3/2281 |
| 10,750,009 | B1* | 8/2020 | Cox | H04M 3/42068 |
| 10,750,010 | B1* | 8/2020 | Fowler | H04M 3/42068 |
| 10,771,624 | B1* | 9/2020 | Penar | H04L 63/08 |
| 10,938,982 | B1* | 3/2021 | Merchant | H04M 3/42059 |
| 2003/0187992 | A1* | 10/2003 | Steenfeldt | H04L 67/20 709/227 |
| 2005/0101306 | A1* | 5/2005 | Zabawskyj | H04L 29/06027 455/414.1 |
| 2010/0165980 | A1* | 7/2010 | Sargor | H04L 12/66 370/352 |
| 2014/0349623 | A1* | 11/2014 | Hou | H04W 12/128 455/414.1 |
| 2015/0043724 | A1* | 2/2015 | Farris | H04M 3/42059 379/142.05 |
| 2016/0173687 | A1* | 6/2016 | Ehrlich | H04M 3/42357 379/45 |
| 2017/0118256 | A1* | 4/2017 | Bouvet | H04L 65/1016 |
| 2019/0037074 | A1* | 1/2019 | Yacov | H04L 67/02 |
| 2021/0044616 | A1* | 2/2021 | Kantorowicz | H04W 12/48 |
| 2021/0058507 | A1* | 2/2021 | Cornwell | H04M 3/2218 |

FOREIGN PATENT DOCUMENTS

| | | |
|---|---|---|
| CN | 103095690 A | 5/2013 |
| CN | 106549953 A | 3/2017 |
| CN | 106850931 A | 6/2017 |
| CN | 104093153 B | 10/2017 |
| CN | 107623768 A | 1/2018 |
| CN | 108111530 A | 6/2018 |
| CN | 108270931 A | 7/2018 |
| CN | 108366173 A | 8/2018 |
| CN | 109257480 A | 1/2019 |
| WO | WO 2006/024813 A1 | 3/2006 |

OTHER PUBLICATIONS

ZTE Corporation, CN First Office Action with English Translation, CN 201811022966.X, dated Oct. 9, 2021, 14 pgs.

* cited by examiner

INCOMING CALL PROCESSING METHOD, MOBILE TERMINAL, AND COMPUTER STORAGE MEDIUM

CROSS REFERENCE TO RELATED APPLICATIONS

This application is a United States National Stage Application filed under 35 U.S.C. § 371 of PCT Patent Application Serial No. PCT/CN2019/101878 filed Aug. 22, 2019, which claims the priority to Chinese Patent Application No. CN201811022966.X, filed Sep. 3, 2018, and titled "Incoming Call Processing Method, Mobile Terminal and Computer Storage Medium", the entire content of which are incorporated herein by reference.

TECHNICAL FIELD

This disclosure relates to, but is not limited to, the field of communications, and more particularly, to an incoming call processing method, a mobile terminal, and a computer storage medium.

BACKGROUND

At present, many malicious harassing calls are initiated by various calling software through network. The calling software may change a calling frequency randomly and a calling number constantly, so it is generally difficult to automatically identify and intercept such malicious calls.

At present, when encountering a malicious harassing call, a mobile terminal may adopt an effective way to prevent harassment by intercepting a call from a stranger or setting call forwarding. However, if the mobile terminal is set to intercept the call from the stranger, users may not be able to use convenient services such as hailing a taxi, takeout and express delivery, as well as miss important calls, thus affecting a normal call function for the users, if the mobile terminal sets call forwarding, not only the normal call of the users may be affected, but also criminals may be given opportunities.

SUMMARY

To solve the existing technical problems, some embodiments of this disclosure provide an incoming call processing method, a mobile terminal, and a computer storage medium which are safer and can ensure a normal call of a user.

To achieve the above objectives, the technical solutions of the embodiments of this disclosure are implemented as follows.

According to a first aspect, the embodiments of this disclosure provide an incoming call processing method applied to a mobile terminal, wherein the method includes: after receiving an incoming call carrying an INVITE signaling, determining, according to the INVITE signaling, a type of a calling number corresponding to the incoming call; determining whether the incoming call is a malicious call based on the type of the calling number; and intercepting the incoming call when it is determined that the incoming call is a malicious call.

According to a second aspect, the embodiments of this disclosure provide a mobile terminal, including an acquisition module, a determination module and a processing module. The acquisition module is configured to after receiving an incoming call carrying an INVITE signaling, determine, according to the INVITE signaling, a type of a calling number corresponding to the incoming call. The determination module is configured to determine whether the incoming call is a malicious call based on the type of the calling number. The processing module is configured to intercept the incoming call when it is determined that the incoming call is a malicious call.

According to a third aspect, the embodiments of this disclosure provide a mobile terminal, and the mobile terminal includes a processor and a memory for storing a computer program capable of running on the processor. The processor is configured to execute steps of the incoming call processing method according to the first aspect when running the computer program.

According to a fourth aspect, the embodiments of this disclosure provide a computer readable storage medium, and a computer program is stored in the computer storage medium. The computer program, when executed by a processor, implements steps of the incoming call processing method according to the first aspect.

According to the incoming call processing method, the mobile terminal and the computer storage medium provided in the above embodiments, the type of the calling number corresponding to the incoming call is determined according to the INVITE signaling carried in the incoming call. Whether the incoming call is a malicious call is determined based on the type of the calling number, and when it is determined that the incoming call is a malicious call, the incoming call is intercepted. In this way, by identifying the incoming call and screening the malicious call when it is determined that the incoming call is a malicious call, a malicious call can be accurately identified and a harassment of the malicious call can be effectively avoided on the premise of not affecting a normal call for the user, thus improving the user experience. Compared with the manner of directly intercepting all unknown calls to screen malicious calls, the embodiments of the present disclosure can avoid providing opportunities to criminals, thus improving safety.

DETAILED DESCRIPTION

The technical solutions of this disclosure will be described in further detail below with reference to the drawings and the specific embodiments. Unless otherwise defined, all the technical and scientific terms used herein have the same meanings as those commonly understood by those having ordinary skill in the art of this disclosure. Terms used herein in the specification of this disclosure are for the purpose of describing specific embodiments only and are not intended to limit this disclosure. As used herein, the term "and/or" includes any and all combinations of one or more related listed items.

Figure 1:
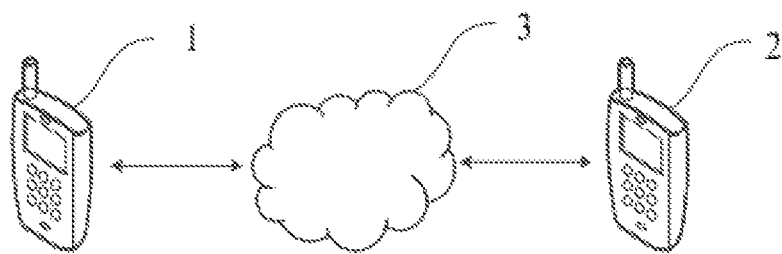
FIG. 1 is a schematic diagram of an application environment of an incoming call processing method according to an embodiment of this disclosure.

FIG. 1 is a schematic diagram of an exemplary application environment for an incoming call processing method provided by an embodiment of this disclosure. The application environment includes a mobile terminal 1 and a calling terminal 2. The mobile terminal 1 and the calling terminal 2 are terminals with a call function, and the mobile terminal 1 communicates with the calling terminal 2 through a network 3, After receiving a call request triggered by an object such as a user, the calling terminal 2 may send a call request for the mobile terminal 1 to the network. The network forwards an incoming call carrying an INVITE signaling to the mobile terminal 1 according to the call request. The mobile terminal 1 determines a type of a calling number corresponding to the incoming call according to the INVITE signaling. For example, when the calling terminal 2 is a mobile terminal such as a mobile phone or a watch phone, if the mobile terminal 1 detects that the INVITE signaling contains an international mobile equipment identity of the calling terminal 2, then it is determined that the type of the calling number corresponding to the incoming call is a mobile phone. When the calling terminal 2 is a fixed terminal such as a fixed-line telephone, if the mobile terminal 1 detects that the calling number corresponding to the incoming call satisfies a preset fixed-line telephone identification condition, then it is determined that the type of the calling number corresponding to the incoming call is a fixed-line telephone. When the calling terminal 2 is a mobile terminal such as a mobile phone or a tablet, if the mobile terminal 1 detects that the calling number corresponding to the incoming call satisfies a preset VOIP identification condition, then it is determined that the type of the calling number corresponding to the incoming call is a VOIP. The mobile terminal 1 intercepts the incoming call when it is determined that a type of the incoming call is a malicious call based on the type of the calling number. In this way, by identifying the incoming call and screening the malicious call when it is determined that the incoming call is a malicious call, the malicious call can be accurately identified and a harassment of the malicious call can be effectively avoided on the premise of not affecting the normal call of the user, thus improving the user experience. Compared with the manner of directly intercepting all unknown calls to screen malicious calls, opportunities to criminals are avoided, thus improving safety. The mobile terminal 1 may be a terminal with a call function such as a smartphone, a watch phone, a tablet, etc. The calling terminal 2 may be a terminal with a call function such as a smartphone, a watch phone, a tablet, a fixed-line telephone, etc.

Figure 2:
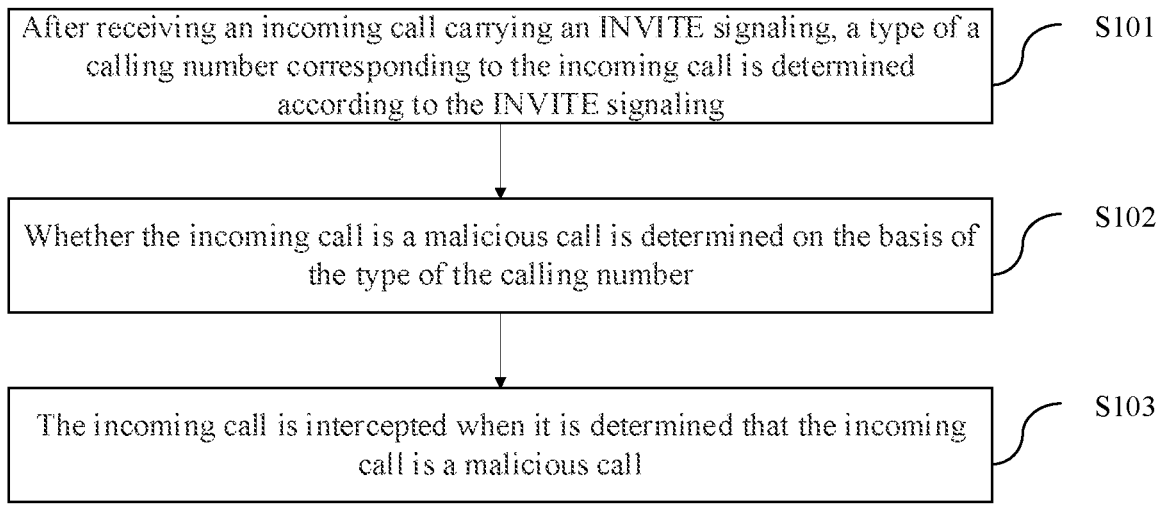
FIG. 2 is a flow chart of an incoming call processing method according to an embodiment of this disclosure.

FIG. 2 illustrates an incoming call processing method provided by an embodiment of this disclosure. The method may be applied to a terminal device 1 in FIG. 1 and includes the following steps.

In step S101, after receiving an incoming call carrying an INVITE signaling, a type of a calling number corresponding to the incoming call is determined according to the INVITE signaling.

After receiving an incoming call carrying an INVITE signaling, the mobile terminal determines, according to the INVITE signaling, the type of the calling number corresponding to the incoming call.

Here, the mobile terminal may access a cellular network, such as a Voice over Long term Evolution (VoLTE) network, a Voice over Wireless Fidelity (VoWiFi) network, a Rich Communication Suite (RCS) network, a 5G network or the like, to perform a call service. A receiving network receives a call request from the calling terminal and afterwards forwards an incoming call carrying an INVITE signaling according to the call request. The INVITE signaling is used to indicate that the calling terminal needs to establish a call with the mobile terminal through a session initiation protocol, and the INVITE signaling may carry information such as a calling number and an international mobile equipment identity of the calling terminal, so that a type of the calling number corresponding to the incoming call can be determined according to the INVITE signaling.

It should be noted that the mobile terminal may be implemented in various forms. For example, the mobile terminal described in the embodiment of this disclosure may be a communication terminal with a call function, such as a smartphone, a watch phone, a tablet, etc. The calling terminal may be a communication terminal with a call function such as a smartphone, a watch phone, a tablet, etc., or a communication terminal such as a fixed-line telephone.

Figure 3:
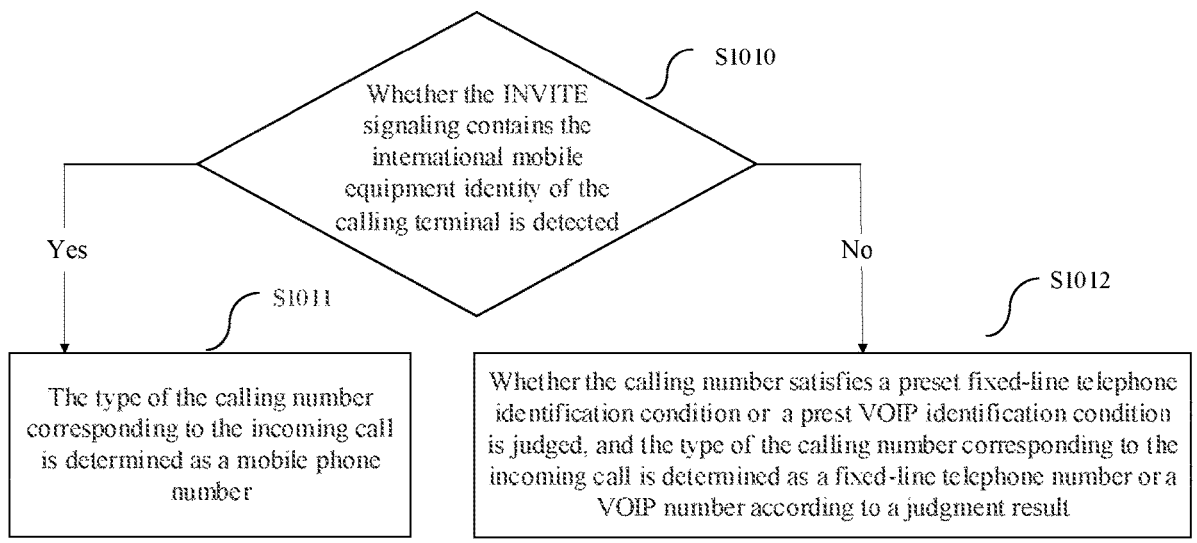
FIG. 3 is a flow chart of determining a type of a calling number corresponding to an incoming call according to an INVITE signaling according to an embodiment of this disclosure.

In an exemplary embodiment, referring to FIG. 3, the determining, according to the INVITE signaling, the type of the calling number corresponding to the incoming call, includes steps S1010 to S1012.

In step S1010, whether the INVITE signaling contains the international mobile equipment identity of the calling terminal is detected; if the international mobile equipment identity is contained, step S1011 is performed; otherwise, step S1012 is performed.

In step S1011, the type of the calling number corresponding to the incoming call is determined as a mobile phone number.

In step S1012, whether the calling number satisfies a preset fixed-line telephone identification condition or a preset VOIP identification condition is judged, and the type of the calling number corresponding to the incoming call is determined as a fixed-line telephone number or a VOIP number according to a judgment result.

Here, the fixed-line telephone identification condition and the VOIP identification condition may be preset according to actual conditions. If the calling number satisfies the preset fixed-line telephone identification condition, then the type of the calling number corresponding to the incoming call is a fixed-line telephone number. If the calling number satisfies the set VOIP identification condition, the type of the calling number corresponding to the incoming call is a VOIP number. For example, the fixed-line telephone identification condition and the VOIP identification condition may be determined according to a type of the calling terminal and/or characteristics of the calling number corresponding to the incoming call. If the incoming call is initiated by a communication terminal with a call function, such as a smartphone, a watch phone, a tablet or the like, i.e., the calling terminal is a communication terminal with a call function, such as a smartphone, a watch phone, a tablet or the like, the calling terminal, when initiating a calling request, may add its international mobile equipment identity (IMEI) to the INVITE signaling. If the incoming call is initiated by a communication terminal such as a fixed-line telephone, i.e., the calling terminal is a communication terminal such as a fixed-line telephone, the calling terminal, when initiating the call request, may unable to add an international mobile equipment identity of the calling terminal to the INVITE signaling. Therefore, if the INVITE signaling contains an international mobile equipment identity of the calling terminal, it indicates that the type of the calling number corresponding to the incoming call is a mobile phone number. If the INVITE signaling does not contain an international mobile equipment identity of the calling terminal, it indicates that the type of the calling number corresponding to the incoming call is a fixed-line telephone number or a VOIP number. Because there are differences between the fixed-line telephone number and the VOIP number in terms of whether the number is not invalid or anonymous, or in terms of length, after it is determined that the INVITE signaling does not contain the international mobile equipment identity of the calling terminal, it may be determined that the type of the calling number corresponding to the incoming call is a fixed-line telephone number or VOIP number according to the judgment result by judging whether the calling number satisfies the preset fixed-line telephone identification condition or the VOIP identification condition.

In this way, whether the type of the calling number corresponding to the incoming call is a mobile phone number is determined by detecting whether the INVITE signaling carried by the incoming call contains the international mobile equipment identity of the calling terminal. Further, when it is determined that the type of the calling number corresponding to the incoming call is not a mobile phone number, the type of the calling number corresponding to the incoming call is determined to be a fixed-line telephone number or a VOIP number according to the preset fixed-line telephone identification condition or VOIP identification condition, thus realizing rapid and accurate identification of the type of the calling number corresponding to the incoming call.

Figure 4:
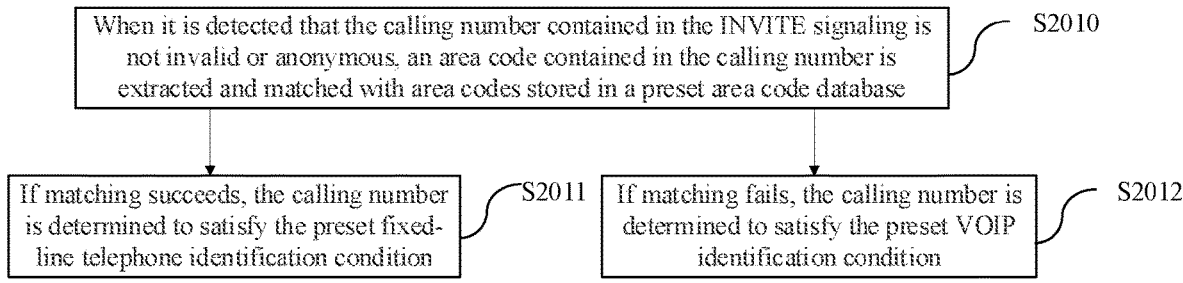
FIG. 4 is a flow chart of judging whether a calling number meets a preset fixed-line telephone identification condition or Voice over Internet Protocol (VOIP) identification condition according to an embodiment of this disclosure.

In an exemplary embodiment, referring to FIG. 4, the judging whether the calling number satisfies the preset fixed-fine telephone identification condition or VOIP identification condition, includes the following steps S2010 to S2012.

In step S2010, when it is detected that the calling number contained in the INVITE signaling is not invalid (i.e., exist) or anonymous, an area code contained in the calling number is extracted and matched with area codes stored in a preset area code database.

In step S2011, if matching succeeds, the calling number is determined to satisfy the preset fixed-line telephone identification condition.

In step S2012, if matching fails, the calling number is determined to satisfy the preset VOIP identification condition.

Here, when the incoming call is initiated by the calling terminal using a mobile phone or a fixed-line telephone, the call number may be contained in the INVITE signaling. Therefore, if it is detected that the calling number contained in the INVITE signaling is invalid or anonymous, it indicates that the incoming call is initiated by the calling terminal using a VOIP, i.e., the type of the calling number corresponding to the incoming call is a VOIP number.

The judging whether the calling number satisfies the preset fixed-line telephone identification condition or VOIP identification condition may include: when it is detected that the calling number contained in the INVITE signaling is invalid or anonymous, or when it is detected that a length of the calling number is greater than a preset length threshold, determining that the calling number satisfies the preset VOIP identification condition. For the fixed-line telephone number, each city has a corresponding area code (also called truck code), and the corresponding area code of each city is unique. When the incoming call is initiated at the calling terminal by using a fixed-line telephone to a telephone terminal located in the same city or different cities, a switch at the network side automatically adds an area code, to which a local number belongs, before the local number used by the calling terminal. Therefore, a matching is performed between the area code contained in the calling number and area codes stored in a preset trunk code database. If the area code contained in the calling number exists in the trunk code database, the matching succeeds, which indicates that the type of the calling number corresponding to the incoming call is a fixed-line telephone number. If the area code contained in the calling number does not exist in the trunk code database, the matching fails, which indicates that the type of the calling number corresponding to the incoming call is a VOIP number. For example, it is assumed that a calling number corresponding to the incoming call is +8602168895028, and a calling number obtained after removing the first "+86" and "0" is 2168895028, which is further matched with the preset trunk code database. Since the preset trunk code database records that an area code of Shanghai City is 21, the matching succeeds, and the type of the calling number corresponding to the incoming call is determined as a fixed-line telephone number.

In addition, since the fixed-line telephone number generally has a fixed length, if it is detected that the length of the calling number is greater than the preset length threshold, it indicates that the type of the calling number corresponding to the incoming call is a VOIP number. The length threshold may be preset according to actual needs. It should be noted that the length of the calling number may refer to a length of the calling number after removing the front "+86", and a length threshold in this case may be preset as 12 digits. Of course, the length of the calling number may also refer to a length of the calling number after removing the front "+86" and "0", and the length threshold at this time may be set as 11 digits.

In this way, the type of the calling number corresponding to the incoming call can be quickly determined according to the preset fixed-line telephone identification condition and VOIP identification condition, and thus the processing speed is improved.

In step S102, whether the incoming call is a malicious call is determined based on the type of the calling number.

The mobile terminal determines whether the incoming call is a malicious call based on the type of the calling number determined in step S101.

Figure 5:
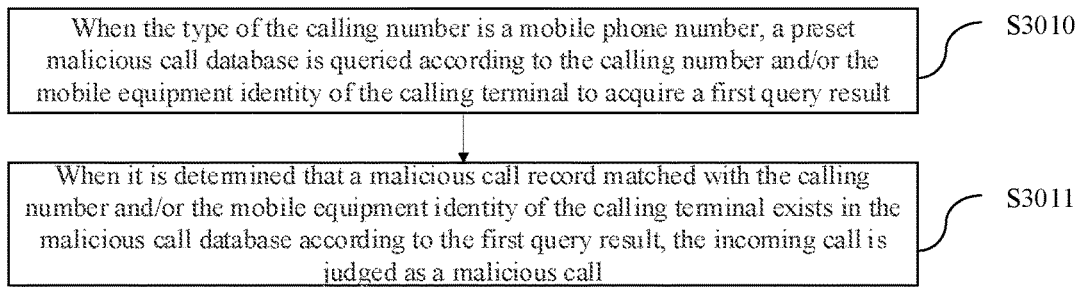
FIG. 5 is a flow chart of determining whether the incoming call is a malicious call based on the type of the calling number according to an embodiment of this disclosure.

In an exemplary embodiment, referring to FIG. 5, the, determining whether the incoming call is a malicious call based on the type of the calling number includes steps S3010 to S3011.

In step S3010, when the type of the calling number is a mobile phone number, a preset malicious call database is queried according to the calling number and/or the mobile equipment identity of the calling terminal to acquire a first query result.

In step S3011, when it is determined that a malicious call record matched with the calling number and/or the mobile equipment identity of the calling terminal exists in the malicious call database according to the first query result, the incoming call is judged as a malicious call.

Here, when the malicious call database records historical malicious call information, the malicious call information may include malicious call information corresponding to mobile phones, and may be updated and adjusted according to actual needs. The malicious call database may be preset in the mobile terminal and/or a server. When the malicious call database is preset in the mobile terminal, the mobile terminal may report acquired malicious call information to the server. Thus, the server may update a malicious call database thereof stored in the server according to the reported malicious call information, and send the updated malicious call database to the mobile terminal. Alternately, the mobile terminal may periodically acquire the updated malicious call database from the server. If the malicious call database is preset in the server, the querying the preset malicious call database according to the calling number and/or the mobile equipment identity of the calling terminal to acquire the first query result may be that: the mobile terminal sends a first query request carrying the calling number and/or the mobile equipment identity of the calling terminal to the server, and receives the first query result returned by the server after querying the preset malicious call database based on the calling number and/or the mobile equipment identity of the calling terminal. If the malicious call database is preset in the mobile terminal, the mobile terminal acquires the first query result based on its own malicious call database.

It is understood that the malicious call record matched with the calling number and/or the mobile equipment identity of the calling terminal exists in the malicious call database, may be referred as a malicious call record carrying the calling number and/or the mobile equipment identity of the calling terminal is stored in the malicious call database. Here, when the incoming call is initiated by a same calling terminal but using different calling numbers, because the mobile equipment identity of the calling terminal is unique, whether the incoming call is a malicious call may be judged just according to the mobile equipment identity of the calling terminal.

In this way, the preset malicious call database is queried according to the current call information, and whether the current call is a malicious call is judged according to the historical malicious call record, which features fast processing speed and high accuracy.

Figure 6:
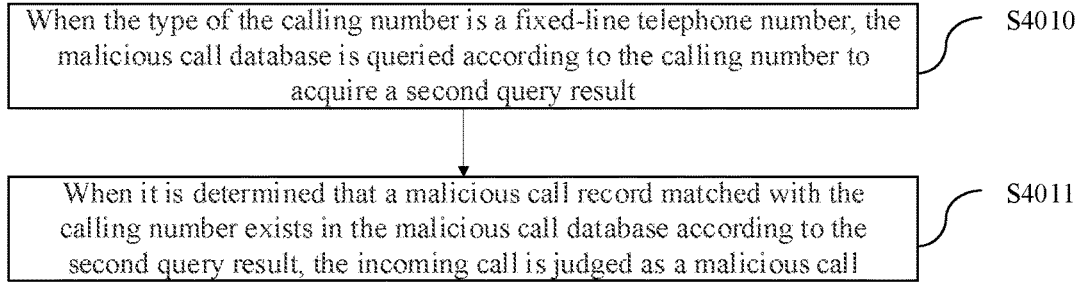
FIG. 6 is a flow chart of determining whether the incoming call is a malicious call based on the type of the calling number according to another embodiment of this disclosure.

In an exemplary embodiment, referring to FIG. 6, the determining whether the incoming call is a malicious call based on the type of the calling number, includes steps S4010 to S4011.

In step S4010, when the type of the calling number is a fixed-line telephone number, the malicious call database is queried according to the calling number to acquire a second query result.

In step S4011, when it is determined that a malicious call record matched with the calling number exists in the malicious call database according to the second query result, the incoming call is judged as a malicious call.

Here, when the malicious call database records historical malicious call information, the malicious call information may include malicious call information corresponding to fixed-line telephones, and may be updated and adjusted according to actual needs. The malicious call database may be preset in the mobile terminal and/or a server. When the malicious call database is preset in the mobile terminal, the mobile terminal may report the acquired malicious call information to the server. Thus, the server may update a malicious call database thereof stored in the server according to the reported malicious call information, and send the updated malicious call database to the mobile terminal. Alternately, the mobile terminal may periodically acquire the updated malicious call database from the server. If the malicious call database is preset in the server, the querying the preset malicious call database according to the calling number to acquire the second query result may be that: the mobile terminal sends a second query request carrying the calling number to the server and receives the second query result returned by the server after querying the preset malicious call database based on the calling number. If the malicious call database is preset in the mobile terminal, the mobile terminal may acquire the second query result based on its own malicious call database.

In this way, the preset malicious call database is queried according to the current call information, and whether the current call is a malicious call is judged according to the historical malicious call record, which features fast processing speed and high accuracy.

Figure 7:
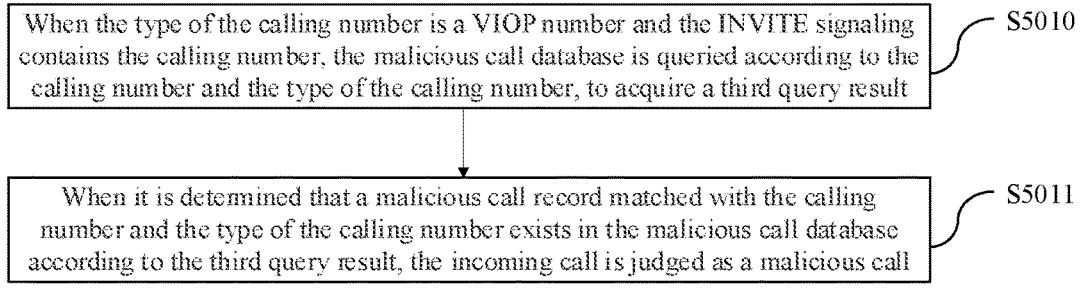
FIG. 7 is a flow chart of determining whether the incoming call is a malicious call based on the type of the calling number according to still another embodiment of this disclosure.

In an exemplary embodiment, referring to FIG. 7, the determining whether the incoming call is a malicious call based on the type of the calling number includes steps S5010 to S5011.

In step S5010, when the type of the calling number is a VIOP number and the INVITE signaling contains the calling number, the malicious call database is queried according to the calling number and the type of the calling number, to acquire a third query result.

In step S5011, when it is determined that a malicious call record matched with the calling number and the type of the calling number exists in the malicious call database according to the third query result, the incoming call is judged as a malicious call.

Here, when the malicious call database records historical malicious call information, the malicious call information may include malicious call information corresponding to VOIP, and may be updated and adjusted according to actual needs. The malicious call database may be preset in the mobile terminal and/or a server. When the malicious call database is preset in the mobile terminal, the mobile terminal may report the acquired malicious call information to the server. Thus, the server may update a malicious call database thereof stored in the server according to the reported malicious call information, and send the updated malicious call database to the mobile terminal. Alternately, the mobile terminal may periodically acquire the updated malicious call database from the server. If the malicious call database is preset in the server, the querying the preset malicious call database to acquire the third query result according to the calling number and the type of the calling number may be that: the mobile terminal sends a third query request carrying the calling number and the type of the calling number to the server and receives the third query result returned by the server after querying the preset malicious call database based on the calling number and the type of the calling number. If the malicious call database is preset in the mobile terminal, the mobile terminal acquires the third query result according to its own malicious call database.

In this way, the preset malicious call database is queried according to the current call information, and whether the current call is a malicious call is judged according to the historical malicious call record, which features fast processing speed and high accuracy.

The determining whether the incoming call is a malicious call based on the type of the calling number, may further include following solutions.

When the type of the calling number is a mobile phone number and when it is determined no malicious call record matched with the calling number and/or the mobile equipment identity of the calling terminal exists in the malicious call database according to the first query result, whether the number of missed calls carrying the calling number and/or the mobile equipment identity of the calling terminal within a preset time threshold range is greater than a preset first threshold number of times is detected. If the number of the missed calls is greater than the preset first threshold number of times, and a rejected call carrying the calling number and/or the mobile equipment identity of the calling terminal exists in the preset time threshold range, the incoming call is judged as a malicious call;

When the type of the calling number is a fixed-line telephone number and when it is determined no malicious call record matched with the calling number exists in the malicious call database according to the second query result, whether the number of missed calls carrying the calling number within the preset time threshold range is greater than a preset second threshold number of times is detected. If the number of the missed calls is greater than the preset second threshold number of times, and a rejected call carrying the calling number exists in the preset time threshold range, the incoming call is judged as a malicious call.

When the type of the calling number is a VOIP number and when it is determined no malicious call record matched with the calling number and the type of the calling number exists in the malicious call database according to the third query result, whether the number of missed calls of the VOIP within the preset time threshold range is greater than a preset third threshold number of times is detected. If the number of the missed calls is greater than the preset third threshold number of times, and a rejected call of the VOIP exists in the preset time threshold range, the incoming call is judged as a malicious call.

It is understood that, the malicious call database may not record all the malicious calls information therein, due to time, region, technology and other factors. Therefore, the malicious call record matched with the calling number and/or the mobile equipment identity of the calling terminal, or the malicious call record matched with the calling number and the type of the calling number may not be found in the malicious call database. In this case, it is required to further judge whether the incoming call is a malicious call. When the type of the calling number is a mobile phone number, if the number of missed calls carrying the calling number and/or the mobile equipment identity of the calling terminal within the preset time threshold range is greater than the preset first threshold number of times, and the rejected call carrying the calling number and/or the mobile equipment identity of the calling terminal exists in the preset time threshold range, it is indicated that the mobile terminal determines that the incoming call carrying the calling number and/or the mobile equipment identity of the calling terminal is harassment, and then the incoming call is judged as a malicious call. Similarly, when the type of the calling number is a fixed-line telephone number, if the number of missed calls carrying the calling number within the preset time threshold range is greater than the preset second threshold number of times, and the rejected call carrying the calling number exists in the preset time threshold range, it is indicated that the mobile terminal determines that the incoming call carrying the calling number is harassment, and then the incoming call is judged as a malicious call. Similarly, when the type of the calling number is a VOIP number, if the number of missed calls of the VOIP within the preset time threshold range is greater than the preset third threshold number of times, and the rejected call of the VOIP exists in the preset time threshold range, it is indicated that the mobile terminal determines that the incoming call with a type of VOIP is harassment, and then the incoming call is judged as a malicious call.

Here, the time threshold range may be preset according to actual situations. For example, may be set as 10 days or 30 days. The first threshold number of times, the second threshold number of times and the third threshold number of times may also be preset according to actual situations. For example, the first threshold number of times may be preset as three, the second threshold number of times may be preset as two, and the third threshold number of times may be preset as five.

In this way, whether the incoming call is a malicious call is further judged according to the conditions of the missed call and the rejected call corresponding to the type of the calling number of the incoming call, which improves the identification accuracy of malicious calls and the user experience.

In step S103, the incoming call is intercepted when it is determined that the incoming call is a malicious call.

When it is determined that the incoming call received in step S101 is a malicious call, the mobile terminal intercepts the incoming call.

Here, the intercepting the incoming call may be that a user interface of the telephone terminal does not display the incoming call and the incoming call is not connected.

In conclusion, according to the incoming call processing method provided in the above embodiments, the type of the calling number corresponding to the incoming call is determined according to the INVITE signaling carried in the incoming call, and whether the incoming call is a malicious call is determined based on the type of the calling number. When it is determined that the incoming call is a malicious call, the incoming call is intercepted. In this way, by identifying the incoming call and screening the malicious call when it is determined that the incoming call is a malicious call, the harassment of malicious calls can be accurately identified and effectively avoided on the premise of not affecting the normal call of the user, thus improving the user experience. Compared with the manner of directly intercepting unknown calls to screen malicious calls, opportunities to criminals are avoided, thus improving safety.

In an exemplary embodiment, the method further includes: when it is determined that the incoming call is a non-malicious call, displaying a call indication of the incoming call.

When it is determined that the incoming call received in step S101 is a non-malicious call, the mobile terminal displays the call indication of the incoming call.

Here, the displaying the call indication of the incoming call may be that a user interface of the mobile terminal shows the incoming call interface and the incoming call is connected.

In this way, when it is determined that the incoming call is a non-malicious call, the call indication of the incoming call is displayed in time to ensure normal communication.

Figure 8:
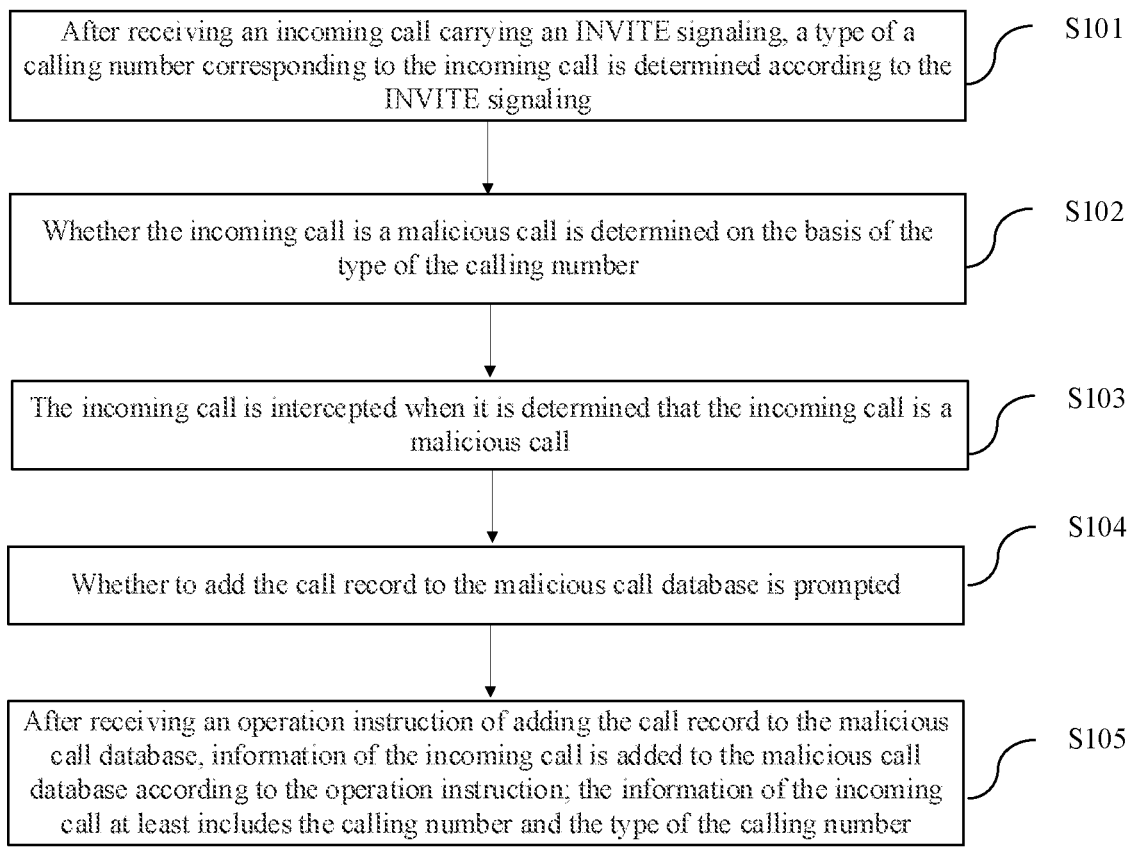
FIG. 8 is a flow chart of an incoming call processing method according to another embodiment of this disclosure.

In an exemplary embodiment, as shown in FIG. 8, after the determining that the incoming call is a malicious call the method further includes the following steps.

In step S104, whether to add the call record to the malicious call database is prompted.

In step S105, after receiving an operation instruction of adding the call record to the malicious call database, information of the incoming call is added to the malicious call database according to the operation instruction. The information of the incoming call at least includes the calling number and the type of the calling number.

After it is determined that the incoming call is a malicious call, the mobile terminal prompts the user through a user interface whether to add the call record to the malicious call database. If the operation instruction of adding the call record to the malicious call database is received, the information of the incoming call is added to the malicious call database. If the operation instruction of adding the call record to the malicious call database is not received, the information of the incoming call is not added to the malicious call database.

Here, the prompting whether to add the call record to the malicious call database may be to pop up a window on the user interface showing a prompt message of whether to add the call record to the malicious call database. When the malicious call database is preset in the server, the adding the information of the incoming call to the malicious call database according to the operation instruction may be that: the telephone terminal reports the information of the incoming call to the server, so that the server adds the information of the incoming call to the malicious call database. When the type of the calling number is a mobile phone number, the information of the incoming call may also include the mobile equipment identity of the calling terminal.

In this way, the malicious call database is enriched and expanded by recording the incoming call information judged as malicious calls into the malicious call database, thereby improving the accuracy of the malicious call database in identifying malicious calls.

Figure 9:
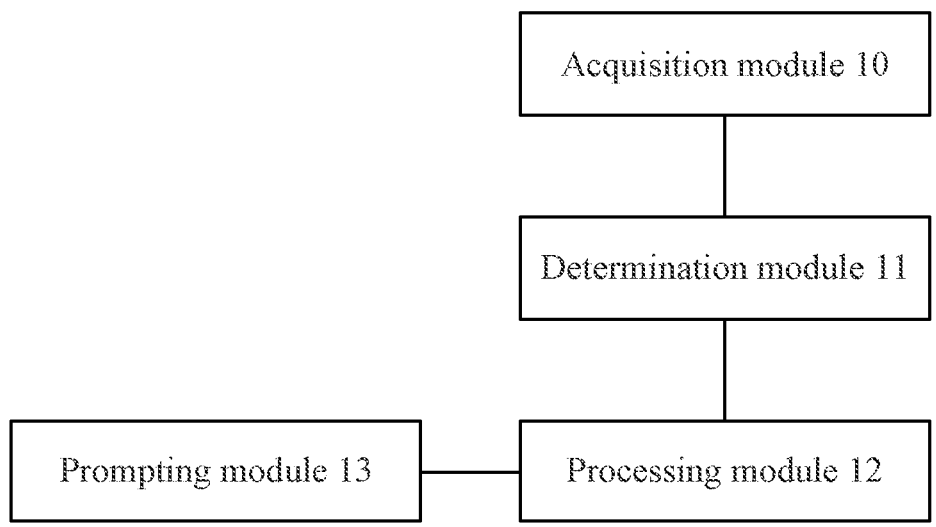
FIG. 9 is a schematic structural diagram of a mobile terminal according to an embodiment of this disclosure.

To realize the above methods, some embodiments of this disclosure also provide a mobile terminal, as shown in FIG. 9, which includes an acquisition module 10, a determination module 11 and a processing module 12.

The acquisition module 10 is configured to: after receiving an incoming call carrying an INVITE signaling, determine, according to the INVITE signaling, a type of a calling number corresponding to the incoming call.

The determination module 11 is configured to: determine whether the incoming call is a malicious call based on the type of the calling number.

The processing module 12 is configured to: intercept the incoming call when it is determined that the incoming call is a malicious call.

In conclusion, according to the mobile terminal provided in the above embodiment, the type of the calling number corresponding to the incoming call is determined according to the INVITE signaling carried in the incoming call, and whether the incoming call is a malicious call is determined based on the type of the calling number. When it is determined that the incoming call is a malicious call, the incoming call is intercepted. In this way, by identifying the incoming call and screening the malicious call when it is determined that the incoming call is a malicious call, malicious calls can be accurately identified and a harassment of malicious calls can be effectively avoided on the premise of not affecting the normal call of the user, thus improving the user experience. Compared with the manner of directly intercepting all unknown calls to shield malicious calls, opportunities to criminals are avoided, thus improving safety.

In an exemplary embodiment, the acquisition module 10 is specifically configured to: detect whether the INVITE signaling contains an international mobile equipment identity of a calling terminal.

If the international mobile equipment identity is contained, the type of the calling number corresponding to the incoming call is determined as a mobile phone number.

If the international mobile equipment identity is not contained, whether the calling number satisfies a preset fixed-line telephone identification condition or VOIP identification condition is judged; and whether the type of the calling number corresponding to the incoming call is a fixed-line telephone number or a VOIP number is further determined according to a judgment result.

In this way, whether the type of the calling number corresponding to the incoming call is a mobile phone number is determined by detecting whether the INVITE signaling carried by the incoming call contains the international mobile equipment identity of the calling terminal. When it is determined that the type of the calling number corresponding to the incoming call is not a mobile phone number, the type of the calling number corresponding to the incoming call is determined to be a fixed-line telephone number or a VOIP number according to the preset fixed-line telephone identification condition or VOIP identification condition. Thus, rapid and accurate identification of the type of the calling number corresponding to the incoming call can be realized.

In an exemplary embodiment, the acquisition module 10 is specifically configured to: extract an area code contained in the calling number and match the extracted area code with area codes stored in a preset area code database, when it is detected that the calling number contained in the INVITE signaling is not invalid and is not anonymous.

If matching succeeds, it is determined that the calling number satisfies the preset fixed-line telephone identification condition.

If matching fails, it is determined that the calling number satisfies the preset VOIP identification condition.

Alternately, when it is detected that the calling number contained in the INVITE signaling is invalid or anonymous, or when it is detected that a length of the calling number is greater than a preset length threshold, it is determined that the calling number satisfies the preset VOIP identification condition.

In this way, the type of the calling number corresponding to the incoming call is quickly determined according to the preset fixed-line telephone identification condition and VOIP identification condition, and the processing speed is improved.

In an exemplary embodiment, the determination module 11 is configured to: when the type of the calling number is a mobile phone number, query a preset malicious call database to acquire a first query result according to the calling number and/or the mobile equipment identity of the calling terminal.

When it is determined that a malicious call record matched with the calling number and/or the mobile equipment identity of the calling terminal exists in the malicious call database according to the first query result, the incoming call is judged as a malicious call.

Alternately, the determination module 11 is configured to: when the type of the calling number is a fixed-line telephone number, query the malicious call database to acquire a second query result according to the calling number.

When it is determined that a malicious call record matched with the calling number exists in the malicious call database according to the second query result, the incoming call is judged as a malicious call.

Alternately, the determination module 11 is configured to: when the type of the calling number is a network phone number and the INVITE signaling contains the calling number, query the malicious call database to acquire a third query result according to the calling number and the type of the calling number.

When it is determined that a malicious call record matched with the calling number and the type of the calling number exists in the malicious call database according to the third query result, the incoming call is judged as a malicious call.

In this way, the preset malicious call database is queried according to the current call information, and whether the current call is a malicious call is judged according to the historical malicious call record, which features fast processing speed and high accuracy.

In an exemplary embodiment, the determination module 11 is configured to: detect whether the number of missed calls carrying the calling number and/or the mobile equipment identity of the calling terminal within a preset time threshold range is greater than a preset first threshold number of times, when the type of the calling number is a mobile phone number and when it is determined no malicious call record matched with the calling number and/or the mobile equipment identity of the calling terminal exists in the malicious call database according to the first query result; judge that the incoming call is a malicious call if the number of missed calls is greater than the preset first threshold number of times, and a rejected call carrying the calling number and/or the mobile equipment identity of the calling terminal exists in the preset time threshold range;

detect whether the number of missed calls carrying the calling number within the preset time threshold range is greater than a preset second threshold number of times, when the type of the calling number is a fixed-line telephone number and when it is determined no malicious call record matched with the calling number exists in the malicious call database according to the second query result; judge that the incoming call is a malicious call if the number of missed calls is greater than the preset second threshold number of times, and a rejected call carrying the calling number exists in the preset time threshold range; and detect whether the number of missed calls of the VOIP within the preset time threshold range is greater than a preset third threshold number of times when the type of the calling number is a VOIP number and when it is determined no malicious call record matched with the calling number and the type of the calling number exists in the malicious call database according to the third query result; judge that the incoming call is a malicious call if the number of missed calls is greater than the preset third threshold number of times, and a rejected call of the VOIP exists in the preset time threshold range.

In this way, whether the incoming call is a malicious call is further judged, according to conditions of the missed call and the rejected call corresponding to the type of the calling number of the incoming call, which improves the identification accuracy of malicious calls and the user experience.

In an exemplary embodiment, the mobile terminal further includes a prompting module 13.

The prompting module 13 is configured to prompt whether to add the call record to the malicious call database.

The processing module 12 is further configured to: after receiving an operation instruction of adding the call record to the malicious call database, add information of the incoming call to the malicious call database according to the operation instruction. The information of the incoming call at least includes the calling number and the type of the calling number.

In this way, the malicious call database is enriched and expanded by recording the incoming call information judged as malicious calls into the malicious call database, thereby improving the accuracy of the malicious call database in identifying malicious calls.

In an exemplary embodiment, the prompting module 13 is further configured to: when it is determined that the incoming call is a non-malicious call, display a call indication of the incoming call.

In this way, when it is determined that the incoming call is a non-malicious call, the call indication of the incoming call is displayed in time to ensure normal communication.

It should be noted that, the mobile terminal provided in the above embodiment is exemplified in a division manner of the above-mentioned program modules when implementing the incoming call processing method. In practical application, the above-mentioned processing may be allocated and completed by different program modules as needed. That is, an internal structure of the mobile terminal is divided into different program modules to complete all or part of the above-described processing. In addition, the mobile terminal provided in the above embodiment belongs to the same concept as the embodiments of the incoming call processing method, and the specific implementation process is detailed in the method embodiments, and will not be elaborated here.

Figure 10:
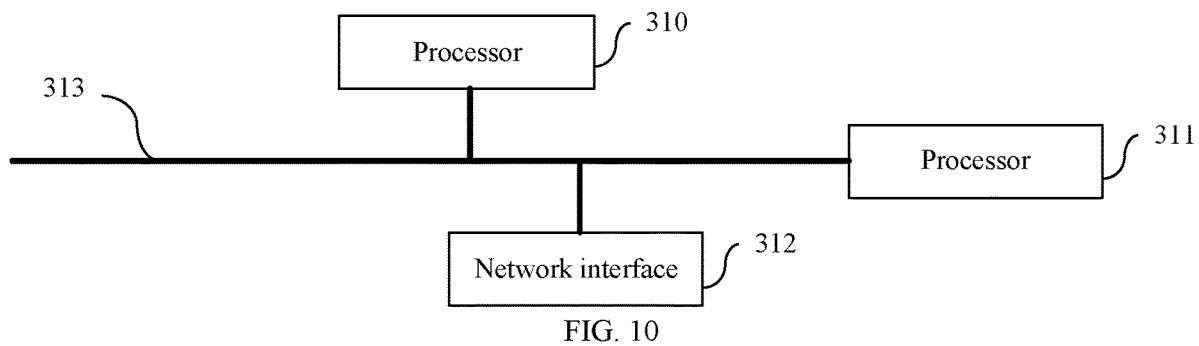
FIG. 10 is a schematic structural diagram of a mobile terminal according to another embodiment of this disclosure.

Some embodiments of this disclosure provide a mobile terminal. As shown in FIG. 10, the mobile terminal includes: a processor 310 and a memory 311 for storing a computer program capable of running on the processor 310. The processor 310 illustrated in FIG. 10 is not used to indicate that there is only one processor 310, but to indicate a position relationship of the processor 310 relative to other devices. In actual application, there may be one or more processor 310. Similarly, the memory 311 illustrated in FIG. 10 is used to indicate a position relationship of the memory 311 relative to other devices. In practical application, there may be one or more memory 311.

The processor 310 is configured to, when running the computer program, execute following steps:

after receiving an incoming call carrying an INVITE signaling, determining, according to the INVITE signaling, a type of a calling number corresponding to the incoming call;

determining whether the incoming call is a malicious call based on the type of the calling number; and intercepting the incoming call when it is determined that the incoming call is a malicious call.

In an exemplary embodiment, the processor 310 is further configured to, when running the computer program, execute following steps:

detecting whether the INVITE signaling contains an international mobile equipment identity of a calling terminal;

if the international mobile equipment identity is contained, determining that the type of the calling number corresponding to the incoming call is a mobile phone number; and if the international mobile equipment identity is not contained, judging whether the calling number satisfies a preset fixed-line telephone identification condition or VOIP identification condition, and determining the type of the calling number corresponding to the incoming call as a fixed-line telephone or VOIP according to a judgment result.

In an exemplary embodiment, the processor 310 is further configured to, when running the computer program, execute following steps:

when it is detected that the calling number contained in the INVITE signaling is not invalid and is not anonymous, extracting an area code contained in the calling number and matching the extracted area code with area codes stored in a preset area code database; if matching succeeds, determining that the calling number satisfies the preset fixed-line telephone identification condition; if matching fails, determining that the calling number satisfies the preset VOIP identification condition;

alternately, when it is detected that the calling number contained in the INVITE signaling is invalid or anonymous, or when it is detected that a length of the calling number is greater than a preset length threshold, determining that the calling number satisfies the preset VOIP identification condition.

In an exemplary embodiment, the processor 310 is further configured to, when running the computer program, execute following steps:

when the type of the calling number is a mobile phone number, querying a preset malicious call database according to the calling number and/or the mobile equipment identity of the calling terminal to acquire a first query result; when it is determined that a malicious call record matched with the calling number and/or the mobile equipment identity of the calling terminal exists in the malicious call database according to the first query result, judging that the incoming call is a malicious call;

alternately, when the type of the calling number is a fixed-line telephone number, querying the malicious call database according to the calling number to acquire a second query result; when it is determined that a malicious call record matched with the calling number exists in the malicious call database according to the second query result, judging that the incoming call is a malicious call;

alternately, when the type of the calling number is a network phone number and the INVITE signaling contains the calling number, querying the malicious call database according to the calling number and the type of the calling number to acquire a third query result; when it is determined that a malicious call record matched with the calling number and the type of the calling number exists in the malicious call database according to the third query result, judging that the incoming call is a malicious call.

In an exemplary embodiment, the processor 310 is further configured to, when running the computer program, execute following steps:

when the type of the calling number is a mobile phone number and when it is determined no malicious call record matched with the calling number and/or the mobile equipment identity of the calling terminal exists in the malicious call database according to the first query result, detecting whether the number of missed calls carrying the calling number and/or the mobile equipment identity of the calling terminal within a preset time threshold range is greater than a preset first threshold number of times; if the number of missed calls is greater than the preset first threshold number of times, and a rejected call carrying the calling number and/or the mobile equipment identity of the calling terminal exists in the preset time threshold range, judging that the incoming call is a malicious call;

when the type of the calling number is a fixed-line telephone number and when it is determined no malicious call record matched with the calling number exists in the malicious call database according to the second query result, detecting whether the number of missed calls carrying the calling number within the preset time threshold range is greater than a preset second threshold number of times; if the number of missed calls is greater than the preset second threshold number of times, and a rejected call carrying the calling number exists in the preset time threshold range, judging that the incoming call is a malicious call; and when the type of the calling number is a VOIP number and when it is determined no malicious call record matched with the calling number and the type of the calling number exists in the malicious call database according to the third query result, detecting whether the number of missed calls of the VOIP within the preset time threshold range is greater than a preset third threshold number of times; if the number of missed calls is greater than the preset third threshold number of times, and a rejected call of the VOIP exists in the preset time threshold range, judging that the incoming call is a malicious call.

In an exemplary embodiment, the processor 310 is further configured to, when running the computer program, execute following steps:

prompting whether to add the call record to the malicious call database; and after receiving an operation instruction of adding the call record to the malicious call database, adding information of the incoming call to the malicious call database according to the operation instruction, wherein the information of the incoming call at least includes the calling number and the type of the calling number.

In an exemplary embodiment, the processor 310 is further configured to, when running the computer program, execute a following step: when it is determined that the incoming call is a non-malicious call, displaying a call indication of the incoming call.

The mobile terminal may further include: at least one network interface 312. Various components in the mobile terminal are coupled together through a bus system 313. It can be understood that the bus system 313 is configured to realize communications among these components. The bus system 313 may include a power bus, a control bus, and a status signal bus in addition to a data bus. However, for the sake of clarity, those various buses are designated as the bus system 313 in FIG. 10.

The memory 311 may be a volatile memory or a non-volatile memory, or may include both volatile and non-volatile memories. The non-volatile memory may be a Read Only Memory (ROM), a Programmable Read-Only Memory (PROM an Erasable Programmable Read-Only Memory (EPROM), an Electrically Erasable Programmable Read-Only Memory (EEPROM), a Ferromagnetic Random Access Memory (FRAM), a Flash Memory, a magnetic surface memory, an optical disc, or a Compact Disc Read- Only Memory (CD-ROM). The magnetic surface memory may be a magnetic disc memory or a magnetic tape memory. The volatile memory may be a Random Access Memory (RAM) that acts as an external high speed cache. By way of exemplary rather not restrictive illustration, a variety of forms of RAMs are available, such as a Static Random Access Memory (SRAM), a Synchronous Static Random Access Memory (SSRAM), a Dynamic Random Access Memory (DRAM), a Synchronous (Synchronous Dynamic Random Access Memory (SDRAM), a Double Data Rate Synchronous Dynamic Random Access Memory (DDRS-DRAM), an Enhanced Synchronous Dynamic Random Access Memory), an SyncLink Dynamic Random Access Memory (SLDRAM), and a Direct Rambus Random Access Memory (DRRAM). The memories 311 described in the embodiments of this disclosure is intended to include, but are not limited to, these and any other suitable types of memories.

The memory 311 in the embodiment of this disclosure is configured to store various types of data to support the operation of the mobile terminal. Examples of such data include: any computer program for operating on the mobile terminal, such as an operating system and an application program; contact data; phonebook data; messages; pictures; and videos, etc. The operating system includes various system programs, such as a framework layer, a core library layer, a driver layer, etc., which are used to realize various basic services and handle hardware-based tasks. The application program may include various application programs, such as a Media Player (Media Player), a Browser (Browser), etc., for implementing various application services. Here, the program for implementing the method of the embodiments of this disclosure may be included in the application program.

Some embodiments provide a computer storage medium in which a computer program is stored. The computer storage medium may be a Ferromagnetic Random Access Memory (FRAM), a Read Only Memory (ROM), a Programmable Read-Only Memory (PROM), a Programmable Read-Only Memory (PROM), an Erasable Programmable Memory (EPROM), an Electrically Erasable Programmable Read-Only Memory (EEPROM), a Flash Memory (Flash Memory), a magnetic surface memory, an optical disc, or a Compact Disc Read-Only Memory (CD-ROM), etc.; and may also be various devices including one or any combination of the above memories, such as a mobile phone, a computer, a tablet device, a personal digital assistant, etc.

In some embodiments, a computer readable storage medium stores a computer program, and the computer program, when being executed by a processor, enables the processor to execute following steps:

after receiving an incoming call carrying an INVITE signaling, determining, according to the INVITE signaling, a type of a calling number corresponding to the incoming call;

determining whether the incoming call is a malicious call based on the type of the calling number; and intercepting the incoming call when it is determined that the incoming call is a malicious call.

In an exemplary embodiment, the computer program, when run by a processor, further executes following steps:

detecting whether the INVITE signaling contains an international mobile equipment identity of a calling terminal;

if the international mobile equipment identity is contained, determining that the type of the calling number corresponding to the incoming call is a mobile phone number; and if the international mobile equipment identity is not contained, judging whether the calling number satisfies a preset fixed-line telephone identification condition or VOIP identification condition, and determining the type of the calling number corresponding to the incoming call as a fixed-line telephone number or VOIP number according to a judgment result.

In an exemplary embodiment, the computer program, when run by a processor, further executes following steps:

when it is detected that the calling number contained in the INVITE signaling is not invalid and is not anonymous, extracting an area code contained in the calling number and matching the extracted area code with area codes stored in a preset area code database; if matching succeeds, determining that the calling number satisfies the preset fixed-line telephone identification condition; if matching fails, determining that the calling number satisfies the preset VOIP identification condition;

alternately, when it is detected that the calling number contained in the INVITE signaling is invalid or anonymous, or when it is detected that a length of the calling number is greater than a preset length threshold, determining that the calling number satisfies the preset VOIP identification condition.

In an exemplary embodiment, the computer program, when run by a processor, further executes following steps:

when the type of the calling number is a mobile phone number, querying a preset malicious call database according to the calling number and/or the mobile equipment identity of the calling terminal to acquire a first query result; when it is determined that a malicious call record matched with the calling number and/or the mobile equipment identity of the calling terminal exists in the malicious call database according to the first query result, judging that the incoming call is a malicious call;

alternately, when the type of the calling number is a fixed-line telephone number, querying the malicious call database according to the calling number to acquire a second query result; when it is determined that a malicious call record matched with the calling number exists in the malicious call database according to the second query result, judging that the incoming call is a malicious call;

alternately, when the type of the calling number is a network phone number and the INVITE signaling contains the calling number, querying the malicious call database according to the calling number and the type of the calling number to acquire a third query result; when it is determined that a malicious call record matched with the calling number and the type of the calling number exists in the malicious call database according to the third query result, judging that the incoming call is a malicious call.

In an exemplary embodiment, the computer program, when run by a processor, further executes following steps:

when the type of the calling number is a mobile phone number and when it is determined no malicious call record matched with the calling number and/or the mobile equipment identity of the calling terminal exists in the malicious call database according to the first query result, detecting whether the number of missed calls carrying the calling number and/or the mobile equipment identity of the calling terminal within a preset time threshold range is greater than a preset first threshold number of times; if the number of missed calls is greater than the preset first threshold number of times, and a rejected call carrying the calling number and/or the mobile equipment identity of the calling terminal exists in the preset time threshold range, judging that the incoming call is a malicious call;

when the type of the calling number is a fixed-line telephone number and when it is determined no malicious call record matched with the calling number exists in the malicious call database according to the second query result, detecting whether the number of missed calls carrying the calling number within the preset time threshold range is greater than a preset second threshold number of times; if the number of missed calls is greater than the preset second threshold number of times, and a rejected call carrying the calling number exists in the preset time threshold range, judging that the incoming call is a malicious call; and when the type of the calling number is a VOID number and when it is determined no malicious call record matched with the calling number and the type of the calling number exists in the malicious call database according to the third query result, detecting whether the number of missed calls of the VOIP within the preset time threshold range is greater than a preset third threshold number of times; if the number of missed calls is greater than the preset third threshold number of times, and a rejected call of the VOIP exists in the preset time threshold range, judging that the incoming call is a malicious call.

In an exemplary embodiment, the computer program, when run by a processor, further executes following steps:

prompting whether to add the call record to the malicious call database; and after receiving an operation instruction of adding the call record to the malicious call database, adding information of the incoming call to the malicious call database according to the operation instruction, wherein the information of the incoming call at least includes the calling number and the type of the calling number.

In an exemplary embodiment, the computer program, when run by a processor, further executes following step: when it is determined that the incoming call is a non-malicious call, displaying a call indication of the incoming call.

Figure 11:
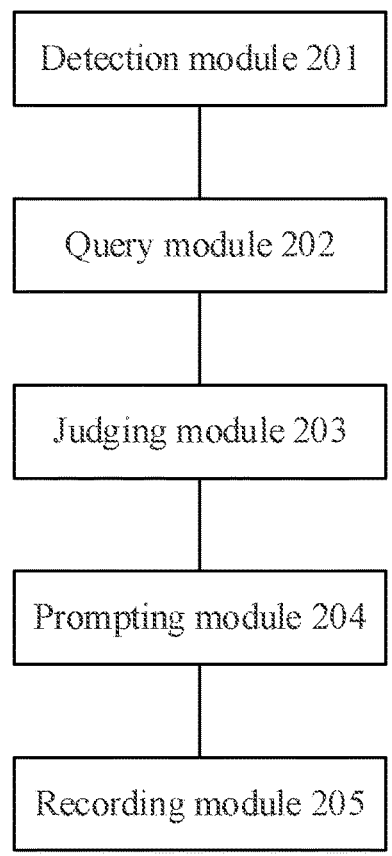
FIG. 11 is a schematic structural diagram of a mobile terminal according to an exemplary embodiment of this disclosure.

Embodiments of this disclosure will be further explained in detail by an exemplary example. In this example, the malicious call database is a blacklist database and the malicious incoming call is a malicious phone number. As shown in FIG. 11, the mobile terminal includes: a detection module 201, a query module 202, a judging module 203, a prompting module 204 and a recording module 205. The detection module 201 is configured to detect a type of an incoming call. The query module 202 is configured to query whether the incoming call matches with information in the blacklist database. The judging module 203 is configured to judge whether the incoming call is a malicious call. The prompting module 204 is configured to prompt the user whether the incoming call is a malicious call and whether to add the incoming call to the blacklist database. The recording module 205 is configured to add the detailed information of the incoming call to the blacklist database.

Figure 12:
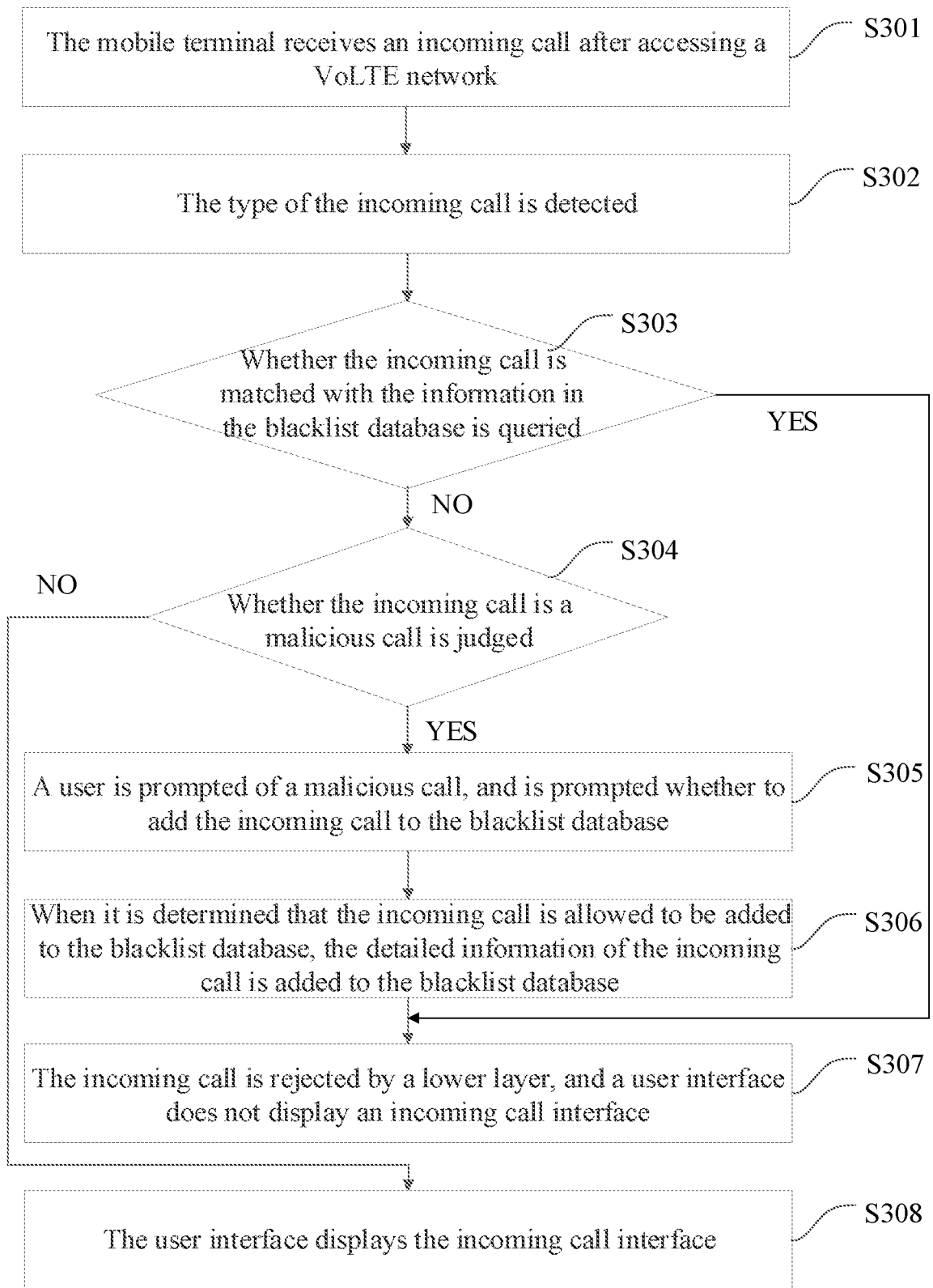
FIG. 12 is a flow chart of an incoming call processing method according to an exemplary embodiment of this disclosure.

Based on the above mobile terminal, as shown in FIG. 12, an incoming call processing method provided in an exemplary embodiment of this disclosure includes the following steps.

In step S301, the mobile terminal receives an incoming call after accessing a VoLTE network.

Here, the incoming call carries an INVITE signaling, and the INVITE signaling is used to indicate that the calling terminal wants to establish a call with the mobile terminal through a session initiation protocol. The INVITE signaling may carry information such as a calling number and an international mobile equipment identity of the calling terminal, so that the type of the calling number corresponding to the incoming call may be determined according to the INVITE signaling.

In step S302, the type of the incoming call is detected.

Here, the mobile terminal analyzes whether the INVITE signaling carried in the incoming call contains information such as the international mobile equipment identity of the calling terminal and whether the calling number is invalid or anonymous through the detection module 201, so as to detect the type of the incoming call. The type of the incoming call may be any one of a mobile phone number, a fixed-line telephone number or a VOIP number.

In step S303, whether the incoming call is matched with the information in the blacklist database is queried, if yes, step S307 is performed; otherwise step S304 is performed.

Here, the telephone terminal queries whether the incoming call is matched with the information in the blacklist database through the query module 202. The blacklist database stores an incoming call's number, an IMEI number of an incoming call, a type of an incoming call and other information. The incoming call's number is a calling number corresponding to the incoming call. The IMEI number of the incoming call is an IMEI carried by the incoming call. The blacklist database may be acquired by the telephone terminal from a server, and the telephone terminal may report the malicious telephone blacklist to the server. The server filters the blacklist database according to a big data analysis technology, and the telephone terminal synchronizes the latest blacklist database from the server to a local telephone terminal in time. If the incoming call is from a fixed-line telephone or a mobile phone, it is searched in the blacklist database according to the calling number and/or the IMEI corresponding to the incoming call. If there is a record matched with the calling number and/or the MEI, the incoming call is judged as a malicious call. If the incoming call is from a fixed-line telephone, it is searched in the blacklist database according to the calling number corresponding to the incoming call. If there is a record matched with the calling number, the incoming call is judged as a malicious call. If the incoming call is from a VOIP (VoIP), it is searched in the blacklist database according to the calling number and/or the type of the calling number corresponding to the incoming call. If there is a record matched with the calling number and the type of the calling number, the incoming call is judged as a malicious call.

In step S304, whether the incoming call is a malicious call is judged.

Here, the mobile terminal may judge whether the incoming call is a malicious call by querying the preset malicious call database according to the type of the incoming call. In addition, whether the incoming call is a malicious call may be determined by information such as a missed call record and a rejected call record, etc.

In step S305, a user is prompted of a malicious call, and is prompted whether to add the incoming call to the blacklist database.

Here, the mobile terminal prompts the user of the malicious call through the prompting module 104, and prompts whether to add the incoming call to the blacklist database.

In step S3116, when it is determined that the incoming call is allowed to be added to the blacklist database, the detailed information of the incoming call is added to the blacklist database.

Here, when the mobile terminal determines that the user agrees to add the incoming call to the blacklist database, the recording module 105 is notified to add the detailed information of the incoming call to the blacklist database. The detailed information of the incoming call includes but is not limited to the calling number the IMEI, the type of the incoming call, etc., corresponding to the incoming call.

In step S307, the incoming call is rejected by a lower layer, and a user interface does not display an incoming call interface.

In step S308, the user interface displays the incoming call interface.

Figure 13:
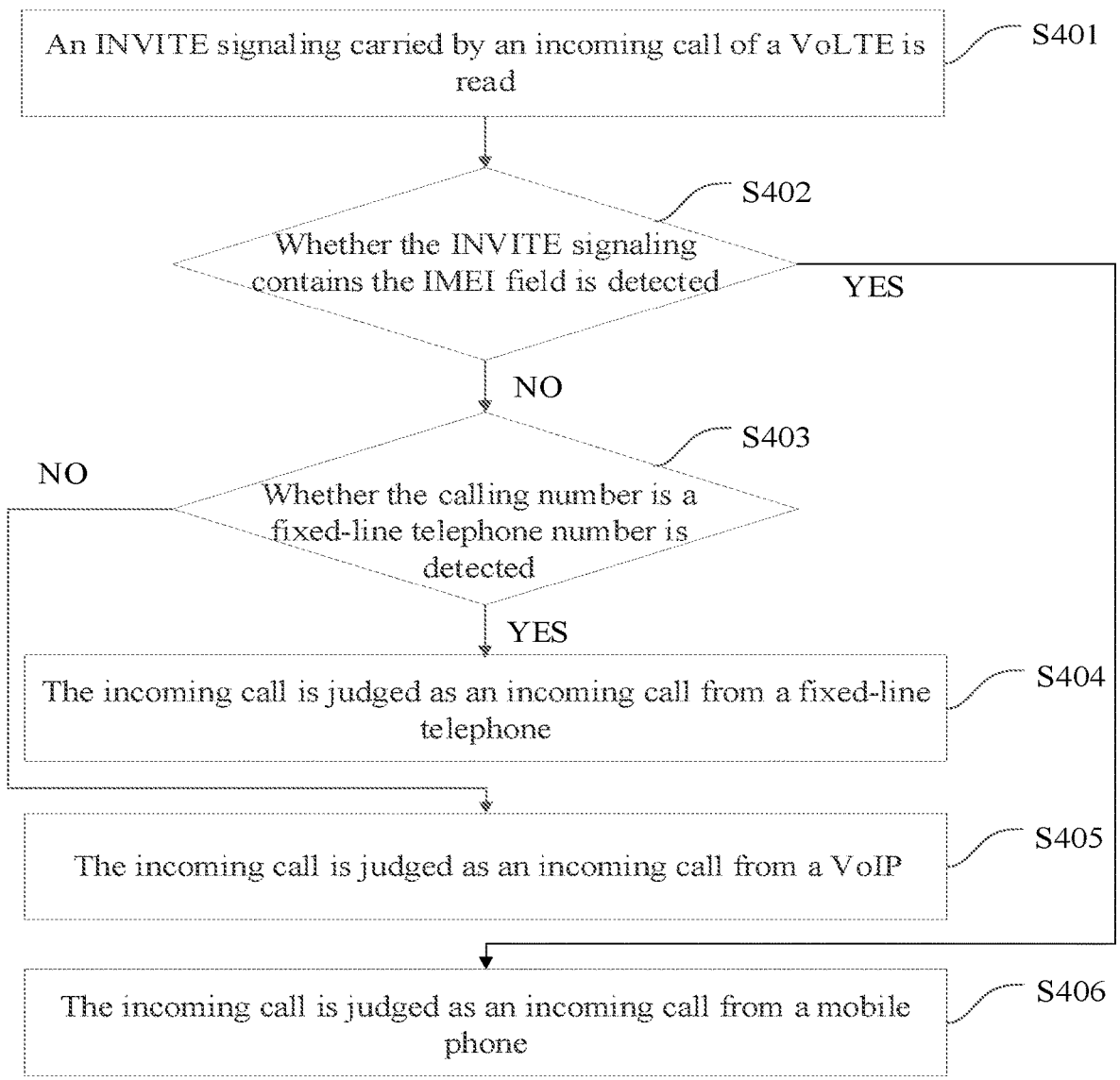
FIG. 13 is a flow chart of detecting a type of an incoming call according to an embodiment of this disclosure.

Referring to FIG. 13, in step S302, the detecting the type of the incoming call includes the following steps S401 to S406.

In step S401, an INVITE signaling carried by an incoming call of a VoLTE is read.

Here, the VoLTE uses the INVITE signaling to establish a call between two or more parties. It is assumed that when the mobile terminal receives an incoming call from a mobile phone, as shown in FIG. 7, the INVITE signaling may carry a calling number and an International Mobile Equipment Identity (IMEI) field of the calling terminal. If a call is from a fixed-line telephone or a Voice over Internet Protocol (VOIP), the INVITE signaling does not carry the IMEI field.

In step S402, whether the INVITE signaling contains the field is detected. If yes, step S406 is performed; otherwise step S403 is performed.

In step S403, whether the calling number is a fixed-line telephone number is detected. If yes, step S404 is performed; otherwise step S405 is performed.

In step S404, the incoming call is judged as an incoming call from a fixed-line telephone.

In step S405, the incoming call is judged as an incoming call from a VoIP.

In step S406, the incoming call is judged as an incoming call from a mobile phone.

Here, for an incoming call from a VoIP, for example, a call initiated by software such as "Call You to Death" generally do not display the calling number, or randomly display a disguised mobile phone number. The fixed-line telephone number consists of an international trunk code, i.e., "country or region code" and "internal number of the country". The International Telecommunication Union (ITU) stipulates that a code length of each country or region is 1 to 3 digits. The first digit refers to a code of nine big regions in the world, which are North America-1, Africa-2, Europe-3/4, South America-5, South Pacific-6, CIS-7, East Asia-8, and Far East and Middle East-9. According to ITU, a total length of a fixed-line telephone number is no more than 12 digits (excluding the prefix "00" for international long-distance call). China's code number is 86, with a length of 2 digits. Therefore, a total length of a fixed-line telephone number in China is no more than 10 digits. A domestic fixed-line telephone number consists of a domestic trunk code and local numbers. The trunk code is a non-uniform number, and a length thereof is N, including 1 to 4 digits. In this way, a length of the local number is 10 minus N. The bigger the city is, the shorter the length of the trunk code is, the longer the length of the local number is, and the larger the local telephone capacity is. For example, a trunk code of Shanghai City is 21, a trunk code of Qingdao City, Shandong Province is 532, and a trunk code of Xiaogan City, Hubei Province is 712. However, with the rapid growth of urban population, the local numbers in some cities are not enough, so the fixed-line telephone numbers in some cities are upgraded to 11 digits. For example, the fixed-line telephone numbers in Qingdao are 0532xxxxxxxx. In addition, when using a fixed-line telephone to call a mobile phone, a switch may automatically add the domestic trunk code before the local number. For example, the mobile phone receives incoming calls from the fixed-line telephone in Shanghai City as 021-68896767 and as 0712-4394152 from the fixed-line telephone in Xiaogan City.

Therefore, based on the above information, the calling number is identified according to following steps to distinguish whether the calling number is from a fixed-line telephone or a VoIP.

1) The calling number is extracted, and if the calling number is invalid or anonymous, the incoming call is judged as an incoming call from a VoIP.

2) "+86" and "0" before the calling number are removed, and then a length of the calling number is calculated. If the length is more than 11 digits, the incoming call is judged as an incoming call from a VoIP. Otherwise, the calling number is matched with a local trunk code database; if matching succeeds, the incoming call is judged as an incoming call from a fixed-line telephone; if matching fails, the incoming call is judged as an incoming call from a VoIP. Here, the local trunk code database records trunk codes of each domestic city, such as the trunk code 21 corresponding to Shanghai City and the trunk code 532 corresponding to Qingdao City.

Here, the detection module 201 performs matching on the trunk codes recorded in the trunk code database with the first few digits of the calling number, and the user may edit the trunk codes in the database. It is assumed that a calling number corresponding to a certain incoming call is 02168895028, a calling number obtained after removing the first digit 0 is 2168895028 with a length of 10 digits, and this calling number is to perform matching with the local trunk code database. Since the local trunk code database records that the trunk code of Shanghai City is 21, the matching succeeds, and the incoming call is judged as an incoming call from a fixed-line telephone.

Figure 14:
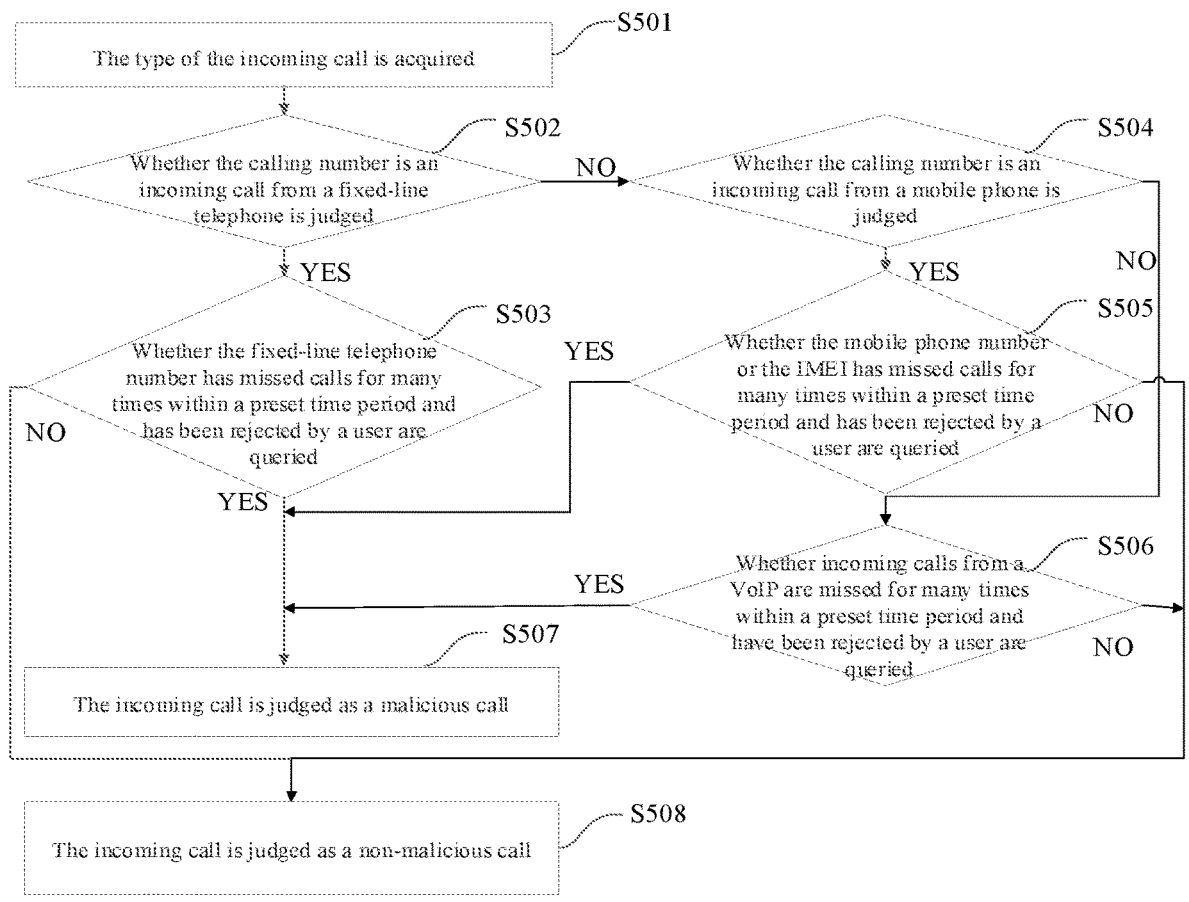
FIG. 14 is a flow chart of determining whether an incoming call is a malicious call according to an embodiment of this disclosure.

Referring to FIG. 14, in step S304, the judging whether the incoming call is a malicious call includes the following steps S501 to S508.

In step S501, the type of the incoming call is acquired.

Specifically, the judging module 203 acquires the type of the incoming call by the detection module 101.

In step S502, Whether the calling number is an incoming call from a fixed-line telephone is judged; if yes, step S503 is performed; otherwise step S504 is performed, in step S503, whether the fixed-line telephone number has missed calls for many times within a preset time period and has been rejected by a user are queried; if yes, step S507 is performed; otherwise step S508 is performed.

In step S504, whether the calling number is an incoming call from a mobile phone is judged; if yes, step S505 is performed; otherwise step S506 is performed.

In step S505, whether the mobile phone number or the WEI has missed calls for many times within a preset time period and has been rejected by a user are queried; if yes, step S507 is performed; otherwise step S508 is performed.

In step S506, whether incoming calls from a VoIP are missed for many times within a preset time period and have been rejected by a user are queried; if yes, step S507 is performed; otherwise step S508 is performed.

In step S507, the incoming call is judged as a malicious call.

In step S508, the incoming call is judged as a non-malicious call.

To sum up, the incoming call processing method provided by the embodiments of this disclosure does not require to modify hardware configurations of the mobile terminal and the existing communication protocols, and does not increase any interface and a signaling burden of a base station or a core network. The type of the incoming call may be determined by using the calling number and the MEI in the INVITE signaling, and further the malicious harassing call from software such as "Call You to Death" can be accurately identified by the type of the incoming call. Therefore, malicious calls can be identified quickly and accurately, and the problem of malicious phone harassment suffered by the users can be solved; communication peace, communication freedom, physical health and property safety of the users are guaranteed, and the user experience is greatly improved. The embodiments are simple and convenient, and provide reference for the rapid promotion of new services such as 5G.

The foregoing descriptions are merely detailed embodiments of this disclosure, but the protection scope of this disclosure is not limited thereto. Those having ordinary skill in the art may easily conceive changes or substitutions within the technical scope of this disclosure, and all the changes or substitutions should be covered by the protection scope of this disclosure. The protection scope of this disclosure shall be subjected to the protection scope of the claims.

What is claimed is:

1. An incoming call processing method, applied to a terminal device and comprising:
    after receiving an incoming call carrying an INVITE signaling, determining, according to the INVITE signaling; a type of a calling number corresponding to the incoming call;
    determining whether the incoming call is a malicious call on the basis of the type of the calling number; and
    intercepting the incoming call when it is determined that the incoming call is a malicious call;
    wherein determining, according to the INVITE signaling, the type of the calling number corresponding to the incoming call comprises:
    detecting whether the INVITE signaling contains an international mobile equipment identity of a calling terminal;
    in response to the INVITE signaling containing the international mobile equipment identity, determining that the type of the calling number corresponding to the incoming call is a mobile phone number; and
    in response to the INVITE signaling not containing the international mobile equipment identity, determining whether the type of the calling number corresponding to the incoming call is a fixed-line telephone number or a VOIP number according to whether the calling number satisfies a preset fixed-line telephone identification condition or a preset VOIP identification condition;
    wherein determining whether the incoming call is a malicious call on the basis of the type of the calling number comprises:
    in response to the type of the calling number being a mobile phone number, querying a preset malicious call database to acquire a first query result according to the calling number and/or the international mobile equipment identity of the calling terminal;
        judging that the incoming call is a malicious call in response to determination that a malicious call record matched with the calling number and/or the mobile equipment identity of the calling terminal exists in the malicious call database according to the first query result;
    in response to the type of the calling number being a fixed-line telephone number, querying the malicious call database to acquire a second query result according to the calling number;
        judging that the incoming call is a malicious call in response to determination that a malicious call record matched with the calling number exists in the malicious call database according to the second query result;
    in response to the type of the calling number being a network phone number and the INVITE signaling containing the calling number, querying the malicious call database to acquire a third query result according to the calling number and the type of the calling number;
        judging that the incoming call is a malicious call in response to determination that a malicious call record matched with the calling number and the type of the calling number exists in the malicious call database according to the third query result.

2. The method according to claim 1, wherein the judging whether the calling number satisfies the preset fixed-line telephone identification condition or the preset VOIP identification condition, comprises:
    when it is detected that the calling number contained in the INVITE signaling is not invalid and is not anonymous, extracting an area code contained in the calling number and matching an extracted area code with area codes stored in a preset area code database;
    if matching succeeds, determining that the calling number satisfies the preset fixed-line telephone identification condition;
    if matching fails, determining that the calling number satisfies the preset VOIP identification condition.

3. The method according to claim 1, wherein the determining whether the incoming call is a malicious call on the basis of the type of the calling number, further comprises:
    when the type of the calling number is a mobile phone number and when it is determined no malicious call record matched with the calling number and/or the mobile equipment identity of the calling terminal exists in the malicious call database according to the first query result, detecting whether a number of missed calls carrying the calling number and/or the mobile equipment identity of the calling terminal within a preset time threshold range is greater than a preset first threshold number of times;
    judging that the incoming call is a malicious call, if the number of missed calls is greater than the preset first threshold number of times, and a rejected call carrying the calling number and/or the mobile equipment identity of the calling terminal exists in the preset time threshold range;
    when the type of the calling number is a fixed-line telephone number and when it is determined no malicious call record matched with the calling number exists in the malicious call database according to the second query result, detecting whether a number of missed calls carrying the calling number within the preset time threshold range is greater than a preset second threshold number of times;
    judging that the incoming call is a malicious call, if the number of missed calls is greater than the preset second threshold number of times, and a rejected call carrying the calling number exists in the preset time threshold range; and
    when the type of the calling number is a VOIP number and when it is determined no malicious call record matched with the calling number and the type of the calling number exists in the malicious call database according to the third query result, detecting whether a number of missed calls of the VOIP within the preset time threshold range is greater than a preset third threshold number of times;

judging that the incoming call is a malicious call, if the number of missed calls is greater than the preset third threshold number of times, and a rejected call of the VOIP exists in the preset time threshold range.

4. The method according to claim 3, wherein after determining that the incoming call is a malicious call, the method further comprises:

prompting whether to add a call record to the malicious call database; and after receiving an operation instruction of adding the call record to the malicious call database, adding information of the incoming call to the malicious call database according to the operation instruction; wherein the information of the incoming call at least comprises the calling number and the type of the calling number.

5. The method according to claim 1, wherein after determining that the incoming call is a malicious call, the method further comprises:

prompting whether to add a call record to the malicious call database; and after receiving an operation instruction of adding the call record to the malicious call database, adding information of the incoming call to the malicious call database according to the operation instruction; wherein the information of the incoming call at least comprises the calling number and the type of the calling number.

6. The method according to claim 1, further comprising:
displaying a call indication of the incoming call when it is determined that the incoming call is a non-malicious call.

7. The method according to claim 1, wherein the judging whether the calling number satisfies the preset fixed-line telephone identification condition or the preset VOIP identification condition, comprises:

when it is detected that the calling number contained in the INVITE signaling is invalid or anonymous, or when it is detected that a length of the calling number is greater than a preset length threshold, determining that the calling number satisfies the preset VOIP identification condition.

8. A mobile terminal, comprising a processor and a memory for storing a computer program capable of running on the processor; wherein, the processor is configured to execute steps of an incoming call processing method when running the computer program; wherein the method comprises:

after receiving an incoming call carrying an INVITE signaling, determining, according to the INVITE signaling, a type of a calling number corresponding to the incoming call;

determining whether the incoming call is a malicious call on the basis of the type of the calling number; and intercepting the incoming call when it is determined that the incoming call is a malicious call;

wherein determining, according to the INVITE signaling, the type of the calling number corresponding to the incoming call comprises:

detecting whether the INVITE signaling contains an international mobile equipment identity of a calling terminal;

in response to the INVITE signaling containing the international mobile equipment identity, determining that the type of the calling number corresponding to the incoming call is a mobile phone number; and in response to the INVITE signaling not containing the international mobile equipment identity, determining whether the type of the calling number corresponding to the incoming call is a fixed-line telephone number or a VOIP number according to whether the calling number satisfies a preset fixed-line telephone identification condition or a preset VOIP identification condition;

wherein determining whether the incoming call is a malicious call on the basis of the type of the calling number comprises:

in response to the type of the calling number being a mobile phone number, querying a preset malicious call database to acquire a first query result according to the calling number and/or the international mobile equipment identity of the calling terminal;

judging that the incoming call is a malicious call in response to determination that a malicious call record matched with the calling number and/or the mobile equipment identity of the calling terminal exists in the malicious call database according to the first query result;

in response to the type of the calling number being a fixed-line telephone number, querying the malicious call database to acquire a second query result according to the calling number;

judging that the incoming call is a malicious call in response to determination that a malicious call record matched with the calling number exists in the malicious call database according to the second query result;

in response to the type of the calling number being a network phone number and the INVITE signaling containing the calling number, querying the malicious call database to acquire a third query result according to the calling number and the type of the calling number;

judging that the incoming call is a malicious call in response to determination that a malicious call record matched with the calling number and the type of the calling number exists in the malicious call database according to the third query result.

9. The mobile terminal according to claim 8, wherein the judging whether the calling number satisfies the preset fixed-line telephone identification condition or the preset VOIP identification condition, comprises:

when it is detected that the calling number contained in the INVITE signaling is not invalid and is not anonymous, extracting an area code contained in the calling number and matching an extracted area code with area codes stored in a preset area code database;

if matching succeeds, determining that the calling number satisfies the preset fixed-line telephone identification condition;

if matching fails, determining that the calling number satisfies the preset VOIP identification condition.

10. The mobile terminal according to claim 8, wherein the judging whether the calling number satisfies the preset fixed-line telephone identification condition or the preset VOIP identification condition, comprises:

when it is detected that the calling number contained in the INVITE signaling is invalid or anonymous, or when it is detected that a length of the calling number is greater than a preset length threshold, determining that the calling number satisfies the preset VOIP identification condition.

11. The mobile terminal according to claim 8, wherein the determining whether the incoming call is a malicious call on the basis of the type of the calling number; further comprises:
when the type of the calling number is a mobile phone number and when it is determined no malicious call record matched with the calling number and/or the mobile equipment identity of the calling terminal exists in the malicious call database according to the first query result, detecting whether a number of missed calls carrying the calling number and/or the mobile equipment identity of the calling terminal within a preset time threshold range is greater than a preset first threshold number of times;
judging that the incoming call is a malicious call, if the number of missed calls is greater than the preset first threshold number of times, and a rejected call carrying the calling number and/or the mobile equipment identity of the calling terminal exists in the preset time threshold range;
when the type of the calling number is a fixed-line telephone number and when it is determined no malicious call record matched with the calling number exists in the malicious call database according to the second query result, detecting whether a number of missed calls carrying the calling number within the preset time threshold range is greater than a preset second threshold number of times;
judging that the incoming call is a malicious call, if the number of missed calls is greater than the preset second threshold number of times, and a rejected call carrying the calling number exists in the preset time threshold range; and
when the type of the calling number is a VOIP number and when it is determined no malicious call record matched with the calling number and the type of the calling number exists in the malicious call database according to the third query result, detecting whether a number of missed calls of the VOIP within the preset time threshold range is greater than a preset third threshold number of times;
judging that the incoming call is a malicious call, if the number of missed calls is greater than the preset third threshold number of times, and a rejected call of the VOIP exists in the preset time threshold range.

12. The mobile terminal according to claim 8, wherein after determining that the incoming call is a malicious call, the method further comprises:
prompting whether to add a call record to the malicious call database; and
after receiving an operation instruction of adding the call record to the malicious call database, adding information of the incoming call to the malicious call database according to the operation instruction; wherein the information of the incoming call at least comprises the calling number and the type of the calling number.

13. The mobile terminal according to claim 11, wherein after determining that the incoming call is a malicious call, the method further comprises:
prompting whether to add a call record to the malicious call database; and
after receiving an operation instruction of adding the call record to the malicious call database, adding information of the incoming call to the malicious call database according to the operation instruction; wherein the information of the incoming call at least comprises the calling number and the type of the calling number.

14. A non-transitory computer readable storage medium, wherein the computer storage medium is stored with a computer program, and when the computer program is executed by a processor, implements steps of an incoming call processing method comprising:
after receiving an incoming call carrying an INVITE signaling, determining, according to the INVITE signaling, a type of a calling number corresponding to the incoming call;
determining whether the incoming call is a malicious call on the basis of the type of the calling number; and
intercepting the incoming call when it is determined that the incoming call is a malicious call;
wherein determining, according to the INVITE signaling, the type of the calling number corresponding to the incoming call comprises:
detecting whether the INVITE signaling contains an international mobile equipment identity of a calling terminal;
in response to the INVITE signaling containing the international mobile equipment identity, determining that the type of the calling number corresponding to the incoming call is a mobile phone number; and
in response to the INVITE signaling not containing the international mobile equipment identity, determining whether the type of the calling number corresponding to the incoming call is a fixed-line telephone number or a VOIP number according to whether the calling number satisfies a preset fixed-line telephone identification condition or a preset VOIP identification condition;
wherein determining whether the incoming call is a malicious call on the basis of the type of the calling number comprises:
in response to the type of the calling number being a mobile phone number, querying a preset malicious call database to acquire a first query result according to the calling number and/or the international mobile equipment identity of the calling terminal;
judging that the incoming call is a malicious call in response to determination that a malicious call record matched with the calling number and/or the mobile equipment identity of the calling terminal exists in the malicious call database according to the first query result;
in response to the type of the calling number being a fixed-line telephone number, querying the malicious call database to acquire a second query result according to the calling number;
judging that the incoming call is a malicious call in response to determination that a malicious call record matched with the calling number exists in the malicious call database according to the second query result;
in response to the type of the calling number being a network phone number and the INVITE signaling containing the calling number, querying the malicious call database to acquire a third query result according to the calling number and the type of the calling number;
judging that the incoming call is a malicious call in response to determination that a malicious call record matched with the calling number and the type of the calling number exists in the malicious call database according to the third query result.

* * * * *